US012594708B2

(12) United States Patent
Van Delden et al.

(10) Patent No.: US 12,594,708 B2
(45) Date of Patent: Apr. 7, 2026

(54) UPGRADING RECYCLED POLYVINYL BUTYRAL

(71) Applicant: Dakip B.V., Wapenveld (NL)

(72) Inventors: Roeland Hans Ferdinand Van Delden, Apeldoorn (NL); Lawrence Fabian Batenburg, Eindhoven (NL)

(73) Assignee: Dakip B.V., Wapenveld (NL)

( * ) Notice: Subject to any disclaimer, the term of this patent is extended or adjusted under 35 U.S.C. 154(b) by 258 days.

(21) Appl. No.: 18/251,250

(22) PCT Filed: Nov. 4, 2021

(86) PCT No.: PCT/NL2021/050679
§ 371 (c)(1),
(2) Date: May 1, 2023

(87) PCT Pub. No.: WO2022/098237
PCT Pub. Date: May 12, 2022

(65) Prior Publication Data

US 2023/0405906 A1 Dec. 21, 2023

(51) Int. Cl.

| | |
|---|---|
| ***B29C 48/285*** | (2019.01) |
| ***B29C 48/00*** | (2019.01) |
| ***B29C 48/14*** | (2019.01) |
| ***B29C 48/255*** | (2019.01) |
| ***B29C 48/36*** | (2019.01) |
| ***B29C 48/76*** | (2019.01) |
| ***B29C 48/92*** | (2019.01) |
| ***B29K 29/00*** | (2006.01) |
| ***B29K 105/26*** | (2006.01) |
| ***B29L 31/00*** | (2006.01) |
| ***C08J 11/06*** | (2006.01) |

(52) U.S. Cl.

CPC .......... *B29C 48/285* (2019.02); *B29C 48/022* (2019.02); *B29C 48/145* (2019.02); *B29C 48/2552* (2019.02); *B29C 48/36* (2019.02); *B29C 48/76* (2019.02); *B29C 48/766* (2019.02); *B29C 48/92* (2019.02); *C08J 11/06* (2013.01); *B29C 2948/922* (2019.02); *B29C 2948/92704* (2019.02); *B29K 2029/00* (2013.01); *B29K 2105/26* (2013.01); *B29L 2031/778* (2013.01); *C08J 2329/14* (2013.01); *Y02W 30/62* (2015.05)

(58) Field of Classification Search

CPC .......... B29C 48/145; B29C 48/76–768; B29C 48/285; B29C 48/022; B29C 48/2552; B29C 48/36; B29C 48/766; B29C 48/92; B29C 2948/922; B29C 2948/92704; B29K 2029/00; B29K 2105/26; B29L 2031/778; C08J 2329/14; C08J 11/06; Y02W 30/62

See application file for complete search history.

(56) References Cited

U.S. PATENT DOCUMENTS

| | | | | |
|---|---|---|---|---|
| 6,506,835 B1 * | 1/2003 | Hofmann | .......... B32B 17/10761 | 525/401 |
| 2006/0030659 A1 * | 2/2006 | DeStio | .......... C08L 67/02 | 524/494 |
| 2008/0271840 A1 * | 11/2008 | Randall | .......... B32B 27/40 | 156/244.23 |
| 2009/0293952 A1 * | 12/2009 | Koran | .......... B32B 17/10688 | 136/256 |
| 2013/0324692 A1 * | 12/2013 | Clark | .......... C08J 11/06 | 425/149 |
| 2015/0125656 A1 * | 5/2015 | Chen | .......... B32B 7/022 | 428/141 |
| 2016/0243744 A1 * | 8/2016 | Gneuss | .......... B29C 48/21 | |
| 2022/0063321 A1 * | 3/2022 | Gouerec, I | .......... B43K 19/02 | |

FOREIGN PATENT DOCUMENTS

| | | |
|---|---|---|
| CN | 103275449 A | 9/2013 |
| WO | 01/21367 A1 | 3/2001 |

OTHER PUBLICATIONS

Database WPI, Week 201745, Thomson Scientific, London, GB, AN 2017-37334H, XP002803499 & CN 106 752 995 A, (Zhongxin Qingyuan Photovoltaic Material), May 31, 2017.
Database WPI, Week 201677, Thomson Scientific, London, GB, AN 2016-48048Q, XP002803500 & CN 105 802 097 A, (Shantou Fukutomi Ind Co Ltd), Jul. 27, 2016.
International Search Report issued in PCT/NL2021/050679; mailed Dec. 8, 2021.
Written Opinion of the International Searching Authority issued in PCT/NL2021/050679; mailed Dec. 8, 2021.

* cited by examiner

*Primary Examiner* — Jeffrey M Wollschlager
(74) *Attorney, Agent, or Firm* — Studebaker Brackett PLLC

(57) ABSTRACT

The invention is directed to a method for producing an upgraded polymer product from recycled polyvinyl butyral, to a polymer product obtainable by said method, to a construction material comprising such polymer product, and to a use of an extruder vacuum pump.

The method of the invention comprises

- feeding a polymer feed stream to an extruder, wherein said polymer feed stream comprises a recycled polyvinyl butyral;
- melting said polymer feed stream in the extruder to produce polymer melt and passing said polymer melt through one or more degassing zones connected to a vacuum pump;
- measuring the melt flow index of the polymer product, wherein the vacuum pump is operated at a pressure that is controlled by the measured melt flow index of the polymer product.

23 Claims, No Drawings

UPGRADING RECYCLED POLYVINYL BUTYRAL

The invention is directed to a method for producing an upgraded polymer product from recycled polyvinyl butyral, to a polymer product obtainable by said method, to a construction material comprising such polymer product, and to a use of an extruder vacuum pump.

Polyvinyl butyral is an industrially important polymer widely used in laminated safety glass and surface treatments because it exhibits a very high adhesion to glass. The primary use of polyvinyl butyral is in safety glass laminates, particularly in automotive and architectural glass. A layer of polyvinyl butyral is compressed between two sheets of glass under heat and pressure. The resulting glass sandwich looks like any other normal sheet of glass. Although laminated glass can break, the pieces of glass remain intact, adhering to the protective polyvinyl butyral layer. Laminated glass has numerous benefits as a result of its safety properties (no injuries caused by flying shards of glass) and its sound insulation properties.

The growing utilisation of plastics in industrial and consumer applications, combined with increased consumer awareness surrounding solid waste recycling, has led to an increased demand for recycled plastic resins and products. Recycling polyvinyl butyral is, however, very demanding in requiring uniform control of polymer properties. Hence, while the glass from laminated glass sources is recycled, the polyvinyl butyral is not. It is a disposable by-product of the glass recycling industry and available in large quantities with no additional collection charges. An alternative to disposal is to recycle the polyvinyl butyral by mechanical means, but central to this is an appreciation of the variation in molecular structure of polyvinyl butyral and its effect on material properties and end use. Polyvinyl butyral is also heavily plasticised and different plasticisers can be present to different extents. In recycling polyvinyl butyral that originates from different manufacturers, the composition of the feed stream thus varies. On top of that, different plasticisers present may interact in a deleterious way and alter the properties of the polyvinyl butyral. As a consequence, the properties of the resulting polymer product are not constant, which is undesirable for many end uses.

Although recycling of polyvinyl butyral is known in the art, typically such methods do not, or do not fully, address the above-indicated problems.

For example, EP-A-2 308 919 is directed to a method of recycling polyvinyl butyral from windshields, wherein the polyvinyl butyral plastic is separated from glass by shattering and in a flotation separation line wherein polyvinyl butyral is contacted with $Na_2SO_4$ to obtain polyvinyl butyral of higher purity.

CA-A-2 048 966 discloses the use of recovered polyvinyl butyral in the manufacture of flooring. For this application, however, plasticised polyvinyl butyral can be used as raw material and the amount and type of plasticisers in the recovered polyvinyl butyral is stated to be non-critical.

US-A-2004/0 175 535 is directed to recycled polyvinyl butyral compositions for back coatings of carpets. Also in this application, the recycled polyvinyl butyral is used as raw material, after a size reduction, and supplemented the polyvinyl butyral with other ingredients to obtain a useful composition.

WO-A-01/21367 discloses a construction material comprising recycled polyvinyl butyral. This document does not describe specific measures to be taken in order to provide a polymer product with constant properties.

CN-A-103 275 449 describes a recycled polyvinyl butyral film that is prepared in a screw extruder using polyvinyl butyral scrap, polyvinyl butyral powder, plasticiser, antioxidant, light stabilising agent, chain extender, a mixture of silver halide and copper oxide, and lurex.

CN-A-106 752 995 discloses a polyvinyl butyral rubber sheet. The rubber sheet is prepared using method comprising the steps of preparing polyvinyl butyral resin, mixing, plasticising and extruding, cooling, shaping and coiling, and cutting and winding.

CN-A-105 802 097 relates to a method for manufacturing a polyvinyl butyral film by recycling a waste polyvinyl butyral material.

In view of the prior art, it would be desirable to provide a method producing a polymer product from recycled polyvinyl butyral with properties that are relatively constant. More in particular, it would be desirable to reduce plasticiser content in recycled polyvinyl butyral in general, so as to purify the recycled polyvinyl butyral. Additionally, it would be advantageous if any differences in plasticiser content of recycled polyvinyl butyral originating from different sources could be reduced or diminished.

Objective of the invention is to address one or more of the above-mentioned disadvantages.

Further objective of the invention is to provide a method for converting recycled polyvinyl butyral into an upgraded polymer product.

The inventors surprisingly found that one or more of these objectives may, at least in part, be met by a method wherein recycled polyvinyl butyral is extruded and the melt flow index of the extruded polymer product is used to control the pressure of a vacuum pump.

Accordingly, in a first aspect the invention is directed to a method for producing an upgraded polymer product from recycled polyvinyl butyral, the method comprising

- feeding a polymer feed stream to an extruder, wherein said polymer feed stream comprises a recycled polyvinyl butyral;
- melting said polymer feed stream in the extruder to produce polymer melt and passing said polymer melt through one or more degassing zones connected to a vacuum pump;
- measuring the melt flow index of the polymer product, wherein the vacuum pump is operated at a pressure that is controlled by the measured melt flow index of the polymer product.

In accordance with the invention, undesirable components (such as relatively volatile components including plasticisers) in the recycled polyvinyl butyral are withdrawn from the polymer melt in the one or more degassing zones of the extruder using a vacuum pump. Measurement of the melt flow index of the extruded product is used as a control variable for the vacuum pump. Hence, the pressure of the vacuum pump is decreased if the melt flow index of the extruded polymer product is lower than a pre-set target value or range, and the pressure of the vacuum pump is increased if the melt flow index of the extruded polymer product is higher than a pre-set target value or range. The result is an extruded polymer product that has relatively constant melt flow index and other polymer properties.

The term “polyvinyl butyral” as used herein is meant to refer to a polyacetal prepared by reacting polyvinyl alcohol with butyraldehyde. Polyvinyl butyral is commercially available from Monsanto Company as Butvar®. The conditions of the reaction between polyvinyl alcohol and butyraldehyde, and their relative concentrations are closely controlled to form polymers containing predetermined proportions of hydroxyl, acetate, and butyral groups. Although chemically not entirely correct, the term poly (vinyl butyrate) is in the art often interchangeably used with the term poly(vinyl butyral). As used in this application, the term "poly(vinyl butyrate)" is meant to refer to a polymer that comprises butyral groups. However, substantial amounts of unreacted vinyl alcohol units typically remain in the chain and so polyvinyl butyral is best regarded as a random copolymer of vinyl butyral, vinyl alcohol units and, to a lesser extent, vinyl acetate units. The vinyl alcohol unit is polar and hydrophilic and the vinyl butyral unit is hydrophobic. The chemical structure of polyvinyl butyral is shown below.

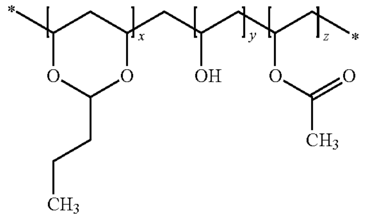

The vinyl alcohol content in commercial polyvinyl butyral can typically be in the range of 5-30% by total weight of the polyvinyl butyral, such as from 10-25%, whereas the vinyl acetate content may be in the range of 0-2.5% by total weight of the polyvinyl butyral, such as 0-2%.

The method of the invention may be used to purify polymer product that comprises recycled polyvinyl butyral. The recycled polyvinyl butyral may originate from various sources, including laminated safety glass (such as from automobile windshields or from construction), photovoltaic modules, flexible packaging, etc.

Typically, the recycled polyvinyl butyral has a weight average molecular weight of 70 000 g/mol or more, as determined by size exclusion chromatography using low angle laser light scattering, such as 100 000 g/mol to 250 000 g/mol, or 120 000 g/mol to 200 000 g/mol.

The polymer feed stream may comprise 65-85% of polyvinyl butyral, based on total weight of the polymer feed stream, preferably 70-85%, or 70-80%.

The polymer feed stream may also comprise 15-35% of plasticisers, based on total weight of the polymer feed stream, preferably 15-30%, such as 20-30%. These plasticisers typically comprise one or more selected from the group consisting of esters of phthalic acids (such as di(2-ethylhexyl phthalate), dibutyl benzyl phthalate), esters of sebacic acids, esters of ricinoleic acids, esters of citric acids, ethers of ethylene glycol, esters of ethylene glycol, esters of ethylene glycol oligomers with butyric and/or hexanoic acid, dialkyl adipates (such as dibutyl adipate, dihexyl adipate and dioctyl adipate), hexyl cyclohexyl adipate, dibutyl sebacate, heptyl adipate, nonyl adipate, dibutyl maleate, mixed alkyl and alkylaryl adipates, glycol carboxylic esters, 1,2-cyclohexane dicarboxylic acid diisononyl ester, diethylene glycol di-2-ethyl butyrate, triethylene glycol di-n-butyrate, triethylene glycol bis(2-ethylhexanoate), and tetraethylene glycol-di-n-heptanoate.

The polymer feed stream comprising polyvinyl butyral is fed to an extruder (such as a twin screw compounding extruder) where the polymer feed stream is melted to produce polymer melt. The feeding rate may be in the range of 100-5000 kg/h, such as 200-4500 kg/h, or 300 to 4000 kg/h, 400-3500 kg/h, or 500-3000 kg/h. The extruder screw speed may be in the range of 10-1200 rpm, such as 50-1100 rpm, 100-1000 rpm, 150-900 rpm, or 200-800 rpm. The operating temperature of the extruder is typically done in the range of 140-190° C., such as 145-180° C., or 150-170° C. The residence time in the extruder may be from 2-40 minutes, such as 5-35 minutes, 10-30 minutes, or 15-25 minutes.

Polymer melt is subsequently passed through one or more degassing zones of the extruder. Degassing or venting is the process of removing gas and other volatile substance. In the one or more degassing zones residual moisture, air, polymer monomers, oligomers, solvents, reaction products, and decomposed materials may be removed. In accordance with the invention particularly removal of plasticisers is important.

Advantageously, the extruder used in the method of the invention may be equipped with a degassing screw. Such a degassing screw has an area behind the compression zone in which the core diameter of the screw decreases again, so that the built up pressure is relieved and the volatile components are sucked off through an opening in the cylinder. This may be followed by a second compression zone and the actual metering zone.

The one or more degassing zones are connected to a vacuum pump, that sucks off volatile components from the polymer melt. If the extruder comprises more than one degassing zone, then a single vacuum pump may be connected to each degassing zone, or each degassing zone may be connected to a separate vacuum pump. Preferably, each degassing zone is connected to a separate vacuum pump.

In accordance with the invention the vacuum pump is operated at a pressure that is controlled by the measured melt flow index (or viscosity) of the polymer product. This means that the measured melt flow index (or viscosity) of the polymer product is used as a control parameter for the pressure applied by the vacuum pump. This may, for example, be done by comparing the measured melt flow index (or viscosity) to a target value for the melt flow index and using a possible deviation as a control parameter for controlling the pressure of the vacuum pump.

If more than one vacuum pump is used, then the pressure at which each of the vacuum pumps are operated does not necessarily need to be the same. For example, the vacuum pressure used in a first degassing zone may be relatively higher than the vacuum pressure in one or more subsequent degassing zones. Preferably, the applied pressure of the vacuum pump is in the range of 10-1000 Pa, such as 20-800 Pa, or 50-500 Pa.

The melt flow index (or viscosity) of the polymer product can be measured in-line, which means that the melt flow index is measured in the product stream. Alternatively, the melt flow index (or viscosity) of the polymer product can be measured on-line, which means that the melt flow index (or viscosity) is measured in a bypass stream. A portion of the stream is then separated from the actual product stream, analysed, and then returned to the product stream. A combination of these measurement methods is of course also possible.

Methods of measuring melt flow index are commonly known, including in-line and on-line methods of measuring melt flow index on an extruder product stream. Melt flow indices as disclosed herein are measured in accordance with ISO 1133 at a load of 2.16 kg and at a temperature of 190° C.

Favourably, the polymer product exiting the extruder has a total amount of plasticisers of 20% or less by total weight of the polymer product, such as 15% or less, or 10% or less. The amount of polyvinyl butyral in the polymer product exiting the extruder can range from 60-90% by total weight of the polymer product, such as 65-85%, or 70-80%. These ranges apply to the polymer product prior to optional subsequent addition of plasticiser, as will be discussed hereinbelow.

The polymer product exiting the extruder preferably has a melt flow index of 1-10 g/10 min, as determined by ISO 1133 at a load of 2.16 kg and at a temperature of 190° C., such as 2-7 g/10 min, 3-6 g/10 min, or 4-5 g/10 min.

The polymer product exiting the extruder further preferably has a glass transition temperature in the range of 10-80° C., as determined by DMA (dynamic mechanical analysis), such as 20-70° C., 25-65° C., or 30-60° C. Preferably, the glass transition temperature of the polymer product exiting the extruder is higher than the glass transition temperature of the polymer feed stream, preferably it is higher by 5° C. or more, such as by 10° C. or more. This increase in glass transition temperature is a result of the removal of plasticiser from the polymer feed stream. The more plasticiser is removed, the larger the increase in glass transition temperature.

Preferably, the method of the invention does essentially not change the average chain length of the polyvinyl butyral in the polymer feed stream. Hence, the average chain length of the polyvinyl butyral in the polymer feed stream may be 90-110% of the average chain length of the polyvinyl butyral in the polymer product, such as 95-105%, or 98-102%.

In a special embodiment, the method of the invention further comprises a step wherein one or more plasticisers are added to the polymer product exiting the extruder. Depending on the application that is envisaged, one or more specific plasticisers may be added to obtain a polymer product with specific properties. Hence, in accordance with this embodiment any undesirable plasticisers that may be present in the polymer feed and could have a negative influence on the properties of the polymer product for a specific application are first removed, before a selection of desirable plasticisers that positively influence the properties of the polymer product for a specific application are added. Apart from the addition of such desirable plasticisers, one or more further additives may be added in order to tune the properties of the polymer product. The addition of the desirable plasticisers, and optional further additives, can be performed downstream of the degassing zones and/or in a subsequent extrusion step. While it may seem counterintuitive to add plasticiser after having purified the recycled polyvinyl butyral from plasticiser, the overall effect is that the final product has a constant, controlled, defined content of specified plasticiser. Preferably, the one or more plasticisers added to the polymer product exiting the extruder comprise one or more selected from the group consisting of adipates, maleates, glycols, and citrates. Suitable adipates include dialkyl adipates (such as dibutyl adipate, dihexyl adipate and dioctyl adipate), hexyl cyclohexyl adipate, heptyl adipate, nonyl adipate, mixed alkyl and alkylaryl adipates, poly(diethylene glycol) adipates, and poly(diethylene glycol-co-neopentylglycol) adipates. Suitable maleates include diethyl maleate, dibutyl maleate, dihexyl maleate, and/or dioctyl maleate. Suitable glycols include, ethers of ethylene glycol, esters of ethylene glycol, esters of ethylene glycol oligomers with butyric and/or hexanoic acid, glycol carboxylic esters, triethylene glycol bis(2-ethylhexanoate), and tetraethylene glycol-di-n-heptanoate. Suitable citrates include triethyl citrate, tributyl citrate, triacetyl citrate, acetyl triethyl citrate, acetyl tributyl citrate.

The amount of plasticisers added to the polymer product exiting the extruder may vary, depending on the intended application, but typically, the amount of added plasticiser(s) is 1-30% by total weight of the polymer product, such as 3-25%, 4-20%, or 5-15%. Too low plasticiser(s) concentrations lead to inflexibility (stiff material at room temperature) and very stiff material at low temperatures. Too high concentrations will lead to very soft, too flexible material. At higher temperatures this may give problems of dimension stability.

If one or more plasticisers are added to the polymer product exiting the extruder, then the melt flow index can be increased to a value of 10-20 g/10 min, as determined by ISO 1133 at a load of 2.16 kg and at a temperature of 190° C., such as 10-15 g/10 min, 11-14 g/10 min, or 12-13 g/10 min.

It is preferred that the method of the invention is performed in a continuous manner. Accordingly, the polymer feed stream may be continuously fed to the extruder, the melt flow index of the polymer product may be continuously measured, and the pressure of the vacuum pump may be continuously controlled by the measured melt flow index of the polymer product.

In a further aspect, the invention is directed to a polymer product obtainable by the method as described herein. Such a polymer product is unique in its chemical composition and properties. It is distinguished on the one hand from virgin polyvinyl butyral due to additives that find their origin in the polyvinyl butyral recycle stream and are not removed during the extrusion processing, and on the other hand from recycle polyvinyl butyral by the reduced amount of volatile components, such as plasticisers. More specifically, the polymer product may have an amount of esters of phthalic acids of 15% or less by total weight of the polymer product, such as 10% or less, 5% or less, or 3% or less. The polymer product may have an amount of esters of sebacic acids of 15% or less by total weight of the polymer product, such as 10% or less, 5% or less, or 3% or less. The polymer product may have an amount of esters of ricinoleic acids of 15% or less by total weight of the polymer product, such as 10% or less, 5% or less, or 3% or less. The polymer product may have an amount of esters of sebacic acids of 15% or less by total weight of the polymer product, such as 10% or less, 5% or less, or 3% or less.

Preferably, the polymer product is enriched in plasticisers selected from the group consisting of adipates, dialkyl adipates, maleates, citrates, and glycols. The polymer product may hence have an amount of adipates of 3% or more based on total weight of the polymer product, such as 5% or more, 10% or more, or 15% or more. The polymer product may have an amount of maleates of 3% or more based on total weight of the polymer product, such as 5% or more, 10% or more, or 15% or more. The polymer product may have an amount of citrates of 3% or more based on total weight of the polymer product, such as 5% or more, 10% or more, or 15% or more. The polymer product may have an amount of glycols of 3% or more based on total weight of the polymer product, such as 5% or more, 10% or more, or 15% or more. Preferably, the total amount of plasticisers in the polymer product including added plasticisers is 10-35% by total weight of the polymer product, such as 15-30%, or 20-25%.

The resulting polymer product comprising upgraded recycled polyvinyl butyral may be utilised, for instance in the preparation of a roofing material.

Accordingly, in a further aspect the invention is directed to a construction material, in particular a roofing material, comprising a polymer product obtainable by the method as described herein. Also encompassed, is a method of preparing a construction material, preferably a roofing material, comprising the production of an upgraded polymer product from recycled polyvinyl butyral as described herein.

In yet a further aspect, the invention is directed to the use of an extruder vacuum pump to remove plasticiser from a polymer feed stream comprising recycled polyvinyl butyral, wherein the vacuum pump is operated at a pressure that is controlled by a measured melt flow index of the polymer product.

All references cited herein are hereby completely incorporated by reference to the same extent as if each reference were individually and specifically indicated to be incorporated by reference and were set forth in its entirety herein.

The use of the terms “a” and “an” and “the” and similar referents in the context of describing the invention (especially in the context of the claims) are to be construed to cover both the singular and the plural, unless otherwise indicated herein or clearly contradicted by context. The terms “comprising”, “having”, “including” and “containing” are to be construed as open-ended terms (i.e., meaning “including, but not limited to”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention claimed is:

1. A method for producing an upgraded polymer product from recycled polyvinyl butyral, the method comprising feeding a polymer feed stream to an extruder, wherein the polymer feed stream comprises a recycled polyvinyl butyral and the polymer feed stream has an amount of plasticiser;

melting the polymer feed stream in the extruder to produce a polymer melt and passing the polymer melt through one or more degassing zones connected to a vacuum pump to produce a polymer product, wherein the polymer product has an amount of plasticiser that is at least 10 wt. % less than the amount of plasticiser in the polymer feed stream;

measuring a melt flow index of the polymer product, wherein the vacuum pump is operated at a pressure that is controlled by the measured melt flow index of the polymer product.

2. The method of claim 1, wherein the polymer feed stream comprises 65-85% by total weight of the polymer feed stream of polyvinyl butyral.

3. The method of claim 1, wherein the polymer feed stream comprises 15-35% by total weight of the polymer feed stream of plasticisers.

4. The method of claim 1, wherein the polymer feed stream comprises 20-30% by total weight of the polymer feed stream of plasticisers.

5. The method of claim 4, wherein the plasticisers comprise one or more selected from the group consisting of esters of phthalic acids, esters of sebacic acids, esters of ricinoleic acids, esters of citric acids, ethers of ethylene glycol, esters of ethylene glycol, esters of ethylene glycol oligomers with one or more of butyric and hexanoic acid, dialkyl adipates, dibutyl maleate, mixed alkyl and alkylaryl adipates, glycol carboxylic esters, 1,2-cyclohexane dicarboxylic acid diisononyl ester, triethylene glycol-bis(2-ethylhexanoate), and tetraethylene glycol-di-n-heptanoate.

6. The method of claim 1, wherein the recycled polymer product has a weight average molecular weight of 70 000 g/mol or more, as determined by size exclusion chromatography using low angle laser light scattering.

7. The method of claim 1, wherein the recycled polyvinyl butyral is recycled from laminated safety glass.

8. The method of claim 1, wherein the extruder comprises multiple degassing zones and each of the degassing zones is connected to a separate vacuum pump.

9. The method of claim 1, wherein the measured melt flow index is compared to a target value for the melt flow index and a possible deviation is used as a control parameter for controlling the pressure of the vacuum pump.

10. The method of claim 1, wherein the polymer melt in the extruder has a temperature of 160-200° C.

11. The method of claim 1, wherein the measuring of melt flow index is performed by one or more of in-line and on-line.

12. The method of claim 1, wherein the pressure is controlled in a range of 10-1000 Pa.

13. The method of claim 1, wherein the polymer product exiting the extruder has a total amount of plasticisers of 20% or less by total weight of the polymer product.

14. The method of claim 1, wherein the polymer product has an amount of polyvinyl butyral of 60-90% by total weight of the polymer product.

15. The method of claim 1, wherein the melt flow index is measured in accordance with ISO 1133 at a load of 2.16 kg and at a temperature of 190° C.

16. The method of claim 1, wherein the polymer product has a melt flow index of 1-10 g/10 min, as determined by ISO 1133 at a load of 2.16 kg and at a temperature of 190° C.

17. The method of claim 1, wherein the polymer product has a glass transition temperature of 9-65° C., as determined by Dynamic Mechanical Analysis.

18. The method of claim 1, wherein the glass transition temperature of the polymer product is higher than the glass transition temperature of the polymer feed stream.

19. The method of claim 1, wherein the average chain length of the polyvinyl butyral in the polymer feed stream is 95-105% of the average chain length of the polyvinyl butyral in the polymer product.

20. The method of claim 1, further comprising adding one or more plasticisers to the polymer product, downstream of the degassing zones, in a subsequent extrusion step, or both.

21. The method according to claim 20, wherein the amount of the one or more plasticisers added is 1-30% by total weight of the polymer product.

22. A method of preparing a construction material, comprising production of an upgraded polymer product from recycled polyvinyl butyral according to the method of claim 1.

23. The method of claim 1, wherein the plasticiser is removed from the polymer melt during passage of the polymer melt through the one or more degassing zones.

* * * * *